(12) United States Patent
Murphy

(10) Patent No.: US 10,743,373 B2
(45) Date of Patent: Aug. 11, 2020

(54) ELECTRIC SUSPENDED RADIANT DISK HEATER APPARATUS

(71) Applicant: CALORAY PTY LTD, Nunawading, Victoria (AU)

(72) Inventor: Ben Murphy, Nunawading (AU)

(73) Assignee: CALORAY PTY LTD, Nunawading (AU)

(*) Notice: Subject to any disclaimer, the term of this patent is extended or adjusted under 35 U.S.C. 154(b) by 344 days.

(21) Appl. No.: 15/493,920

(22) Filed: Apr. 21, 2017

(65) Prior Publication Data

US 2017/0311386 A1 Oct. 26, 2017

(30) Foreign Application Priority Data

Apr. 22, 2016 (AU) .............................. 2016901507

(51) Int. Cl.
| | |
|---|---|
| *H05B 3/20* | (2006.01) |
| *H05B 3/26* | (2006.01) |
| *F24D 13/02* | (2006.01) |
| *F24D 3/16* | (2006.01) |
| *F24H 3/00* | (2006.01) |

(Continued)

(52) U.S. Cl.
CPC ............. *H05B 3/265* (2013.01); *F24C 7/046* (2013.01); *F24D 3/165* (2013.01); *F24D 13/02* (2013.01); *F24H 3/002* (2013.01); *H05B 3/06* (2013.01); *F28F 2215/00* (2013.01); *H05B 2203/032* (2013.01); *Y02B 30/24* (2013.01); *Y02B 30/26* (2013.01)

(58) Field of Classification Search
CPC .. H05B 3/26; H05B 3/06; H05B 3/265; F24C 7/00; F24C 7/04; F24C 7/046; F24C 7/043

USPC ................ 392/407, 408, 432, 429, 430, 434
See application file for complete search history.

(56) References Cited

U.S. PATENT DOCUMENTS

| | | | | |
|---|---|---|---|---|
| 1,368,265 | A | * | 2/1921 | Kuhn ...................... F24C 7/065 392/411 |
| 2,800,563 | A | * | 7/1957 | Browne .................. F24C 7/043 126/85 B |
| 2,897,337 | A | | 7/1959 | Schiff |

(Continued)

FOREIGN PATENT DOCUMENTS

| | | |
|---|---|---|
| DE | 102012025299 A1 | 7/2014 |
| EP | 1972865 A2 | 9/2008 |

(Continued)

OTHER PUBLICATIONS

Extended European Search Report dated Sep. 8, 2017 from European Application No. 17167639.8.

*Primary Examiner* — Lorne E Meade
*Assistant Examiner* — Ayub A Maye
(74) *Attorney, Agent, or Firm* — Innovation Capital Law Group, LLP; Vic Lin

(57) ABSTRACT

There is provided an electric suspended radiant disk heater apparatus comprising: a central and vertical ceiling mount pole for hanging from a ceiling at an upper end thereof in use; a radiant heater disk element fastened at a lower end thereof, the radiant heater disk element being substantially co-axial with the ceiling mount pole, being substantially perpendicular to the ceiling mount pole and extending radially from the lower end of the pole; and an electric heater element thermally coupled to the radiant heater disk element to heat the radiant heater disk to radiate heat from a radiant heat emitting undersurface thereof.

13 Claims, 11 Drawing Sheets

(51) Int. Cl.
*F24C 7/04* (2006.01)
*H05B 3/06* (2006.01)

(56) References Cited

U.S. PATENT DOCUMENTS

| | | | | |
|---|---|---|---|---|
| 3,075,064 | A | * | 1/1963 | Bondonio ............... F24C 7/065 392/422 |
| 3,153,140 | A | * | 10/1964 | Theodore ............... H05B 3/342 219/549 |
| 3,564,200 | A | | 2/1971 | Governale et al. |
| 3,741,478 | A | * | 6/1973 | Summa ............... F28D 21/0008 237/73 |
| 4,677,279 | A | * | 6/1987 | Wesseltoft ............ F24D 13/022 392/435 |
| 4,798,192 | A | * | 1/1989 | Maruko .................... F24C 1/10 126/91 A |
| 4,859,832 | A | * | 8/1989 | Uehara ............. H01L 21/67115 219/411 |
| 7,039,304 | B2 | * | 5/2006 | Gerhardinger ......... A47K 10/06 219/543 |
| 7,194,198 | B2 | * | 3/2007 | Lee ......................... F24C 7/043 219/544 |
| 2009/0139977 | A1 | * | 6/2009 | Falter ................ H01L 21/67115 219/405 |
| 2015/0341988 | A1 | | 11/2015 | Messmer |

FOREIGN PATENT DOCUMENTS

| | | | |
|---|---|---|---|
| GB | 1525656 | A | 9/1978 |
| WO | 2012105787 | A2 | 8/2012 |

\* cited by examiner

ELECTRIC SUSPENDED RADIANT DISK HEATER APPARATUS

FIELD OF THE INVENTION

This invention relates generally to ceiling mounted radiant heaters. More particularly, this invention relates to an electric suspended radiant disk heater apparatus.

BACKGROUND OF THE INVENTION

Building spaces are often difficult to heat effectively given factors such as ceiling configuration, interfering architectural services and encroachments and the like.

Existing heater arrangements comprises elongate radiant heater strips. However, the elongate profile of such radiant heater strips poses mounting difficulties especially for such restrictive ceiling configurations, interfering architectural services and encroachments and the like.

Furthermore, the elongate profile of radiant strip heaters may sag when heated to high temperatures and therefore operation of radiant strip heaters is generally limited to approximately 350° C. which however results in low power output and reach, necessitating installation of additional radiant strip heaters.

Alternatively, higher operational temperature gas fired or electrically powered glow heaters having higher radiant power output may be utilised. However, such glow heaters have less thermal conversion efficiency and the orange incandescence emitted therefrom is undesirous.

The present invention seeks to provide a radiant heater apparatus, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a 'non-glow' electric suspended radiant disk heater apparatus characterised in comprising a pendant-style radiant heater disk element.

The radiant heater disk element is suspended from a central and vertical ceiling mount pole from a ceiling. The radiant heater disk element comprises a circular cross-section, is substantially coaxial with the ceiling mount pole, is substantially perpendicular to the ceiling mount pole and extends radially from the lower end of the pole. The radiant heater disk element is electrically heated so as to radiate heat from a radiant heat emitting undersurface thereof to warm those beneath and around the radiant heater disk apparatus.

As such, the apparatus can provide more targeted heating within a building space as compared to conventional strip heater arrangements thereby allowing for energy savings.

Furthermore, the pendant-style mounting configuration is easier to install and arrange for ceiling configuration restrictions, interfering architectural services and encroachments and the like as compared to conventional strip heater arrangements. The use of a single pole supporting the radiant heater disk element in a pendant-style negates the need for multiple mounts as is the case for conventional strip heater arrangements and furthermore allows for attachment to pitched ceilings.

Furthermore, the disk shape of the radiant heater disk provides an even and targeted and more controllable radial heat footprint.

The disk shape may comprise a radial convex curvature for widening the radius of the heat footprint and may comprise heat dissipation fins for increasing the effective heat dissipation surface.

Furthermore, the configuration of the apparatus may allow for greater power output as compared to conventional strip heater arrangements further reducing the number of installations required. The present apparatus may be rated to 2000 W and cover a floor area of between 3-4.5 m$^2$ depending on the floor space environment.

Furthermore, the radiant heater disk element may comprise a convex radiant underplate, which, but virtue of the shape of the underplate and peripheral support is substantially immune to thermal sagging. As such, the radiant heater disk element may be operated to higher temperatures such as approximately 380° C. Experimentation shows that the present apparatus is able to heat a black body by between 7-9° C. at 2.1 m directly beneath the radiant heater disk element after one hour.

The shape of the convex radiant underplate and, in embodiments, thermal dissipation fins located thereon may increase the effect of surface area of the radiant underplate allowing for a desirous power output yet while a small form factor design.

Furthermore, the radiant heater disk may comprise an aluminium alloy comprising a higher glass temperature (such as a glass temperature of approximately 430° C.) which may be further manufactured using a diecast moulding process uncommon in the industry.

Furthermore, the configuration of the radiant heater disk element in the electric heater element coupled to the rear surface of the radiant underplate allows for rapid heating of the radiant heater disk element wherein experimentation with an infrared gun at an ambient temperature of 29° C. show that the radiant underplate reaches 251° C. at five minutes, 320° C. at 10 minutes, 340° C. at 15 minutes, 350.5° C. at 20 minutes and 353° C. at 25 minutes. Relatedly, the disk shape of the radiant heater discs allows for more uniform heating eliminating or reducing hot and/or cold spots as may be problematic for conventional heatstroke arrangements and the associated temperature control thereof.

Embodiments of the apparatus may further comprise heat shielding configurations including for entrapping convicted air and weatherproofing such as to IP53.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
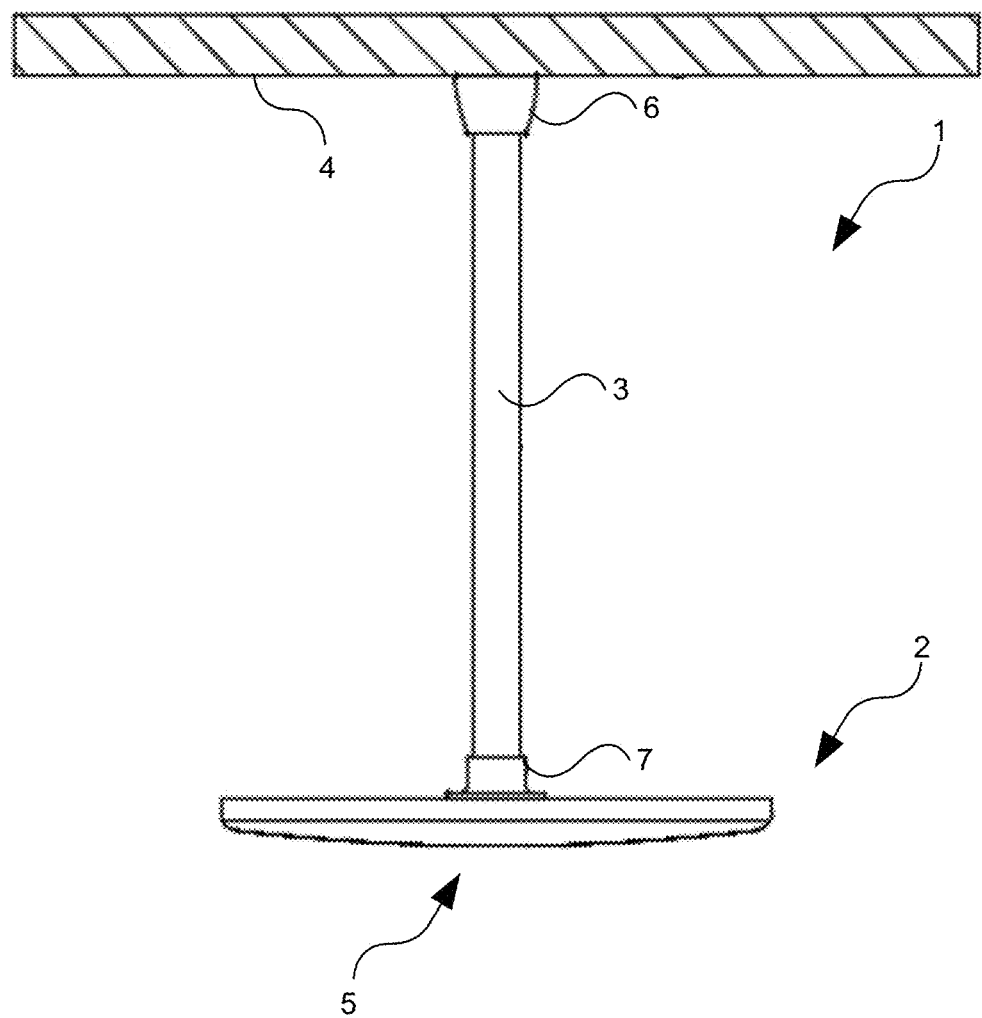
FIG. 1 shows a side elevation view of an electric suspended radiant disk heater apparatus.

FIG. 1 shows a side elevation view of an electric suspended radiant disk heater apparatus 1.

The apparatus 1 comprises a central vertical ceiling mount pole 3 for hanging from a ceiling 4 in use and a radiant disk heater element 2 fastened at a lower end of the ceiling mount pole 3.

The radiant heater disk element 2 is substantially coaxial with the ceiling mount pole 3, is substantially perpendicular to the ceiling mount pole 3 and furthermore extends radially from the lower end of the pole 3.

Figure 2:
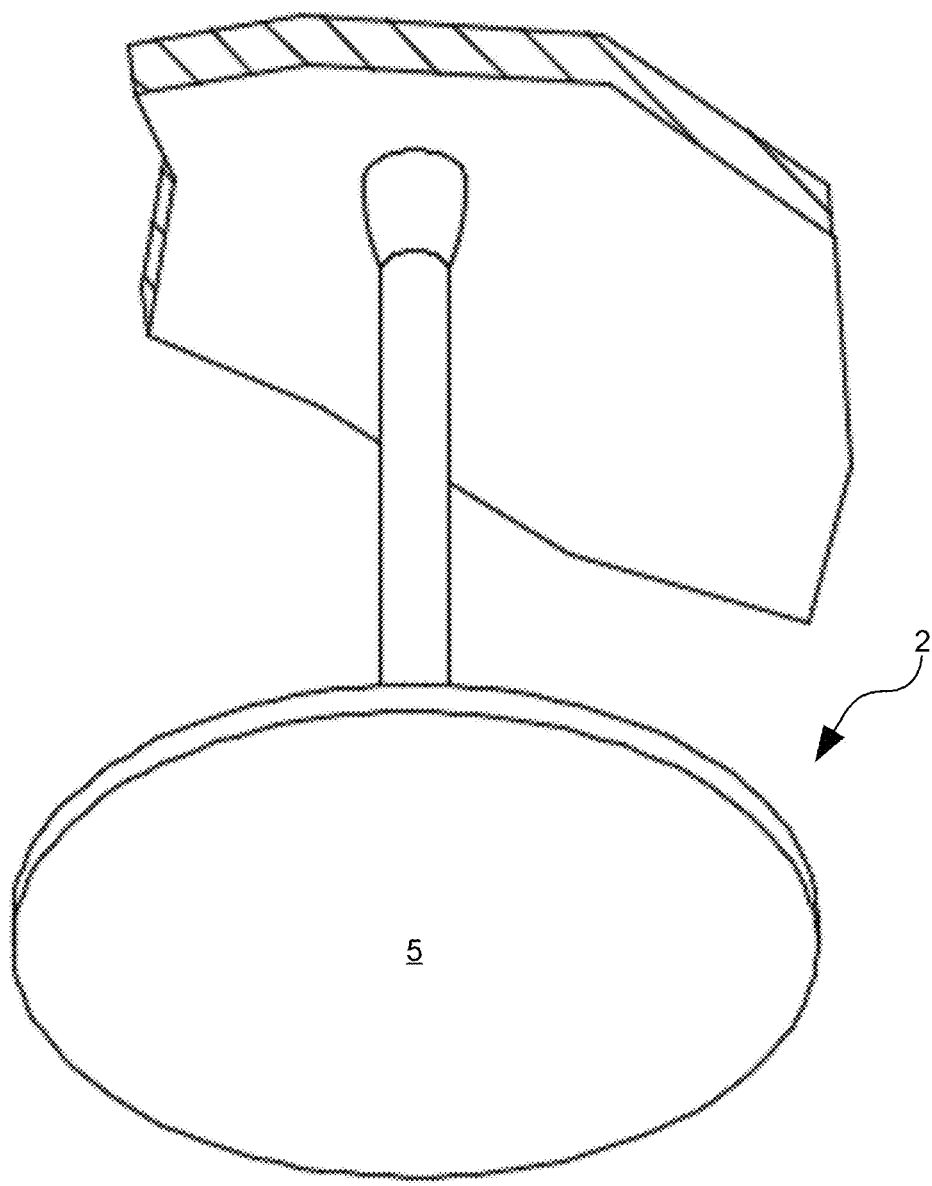
FIG. 2 shows a bottom perspective view of the apparatus.
Figure 3:
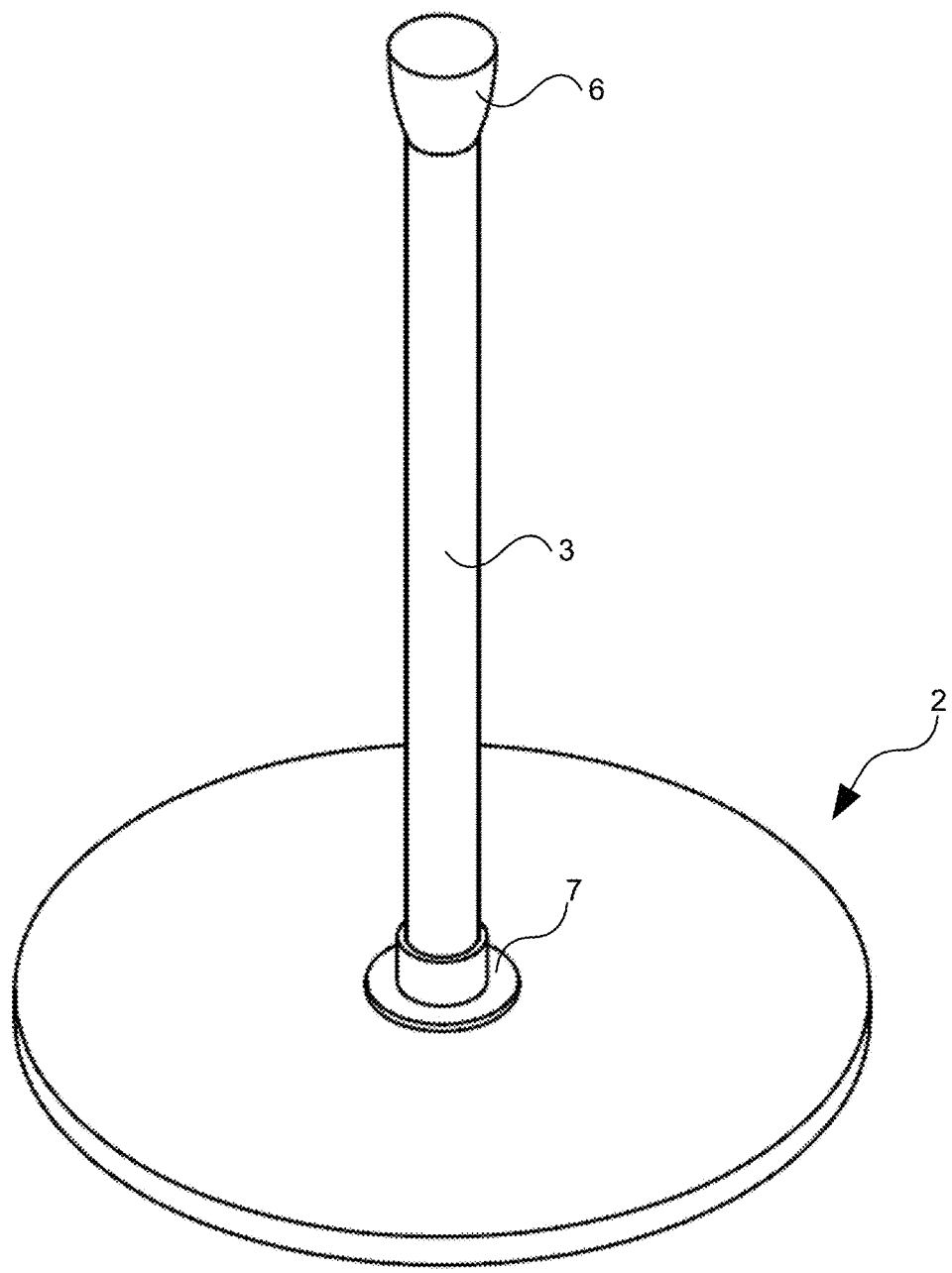
FIG. 3 shows a top perspective view of the apparatus.
Figure 4:
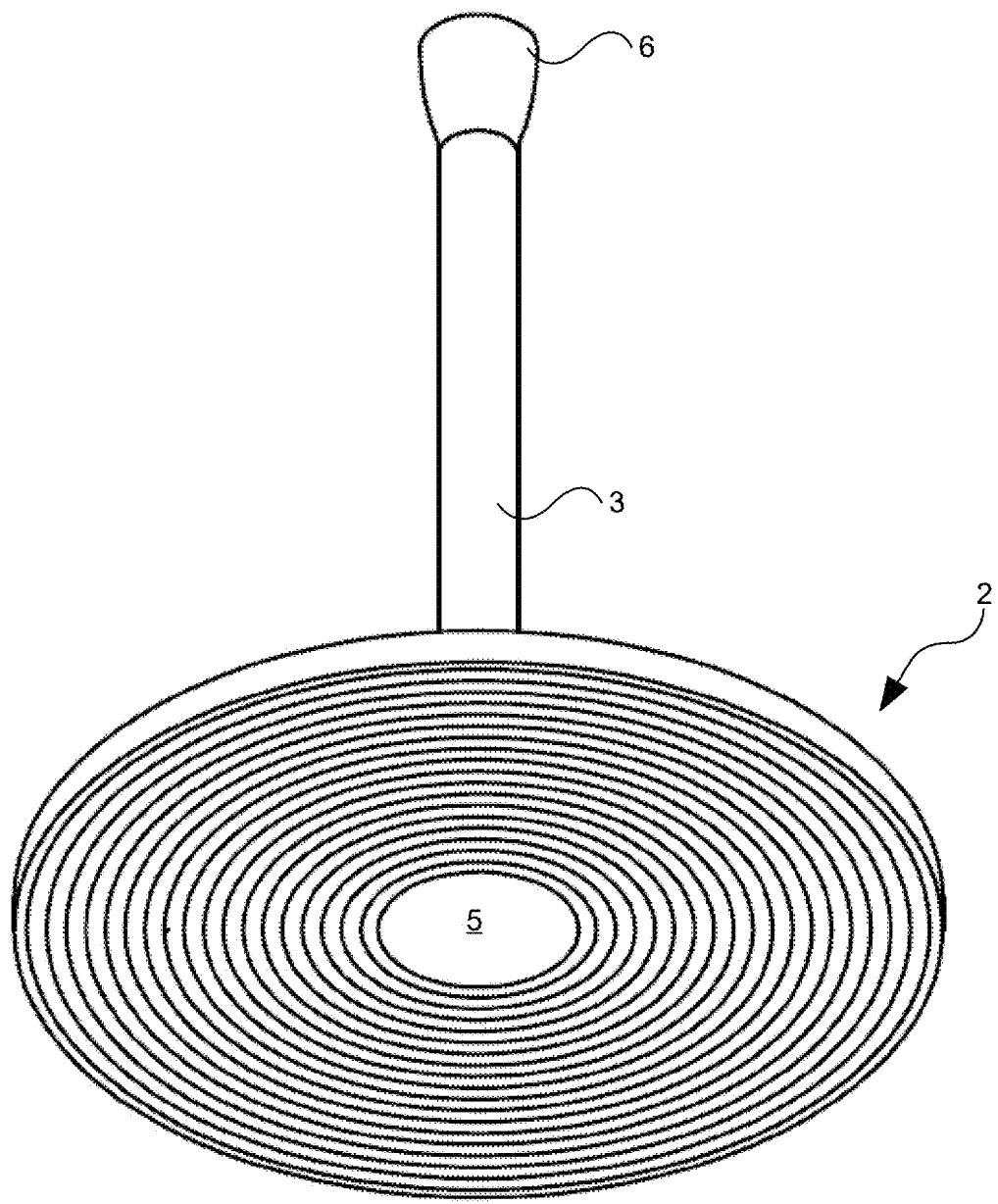
FIG. 4 shows a further bottom perspective view of the apparatus illustrating the heat dissipation fins located on a radiant heat emitting undersurface of the apparatus.
Figure 5:
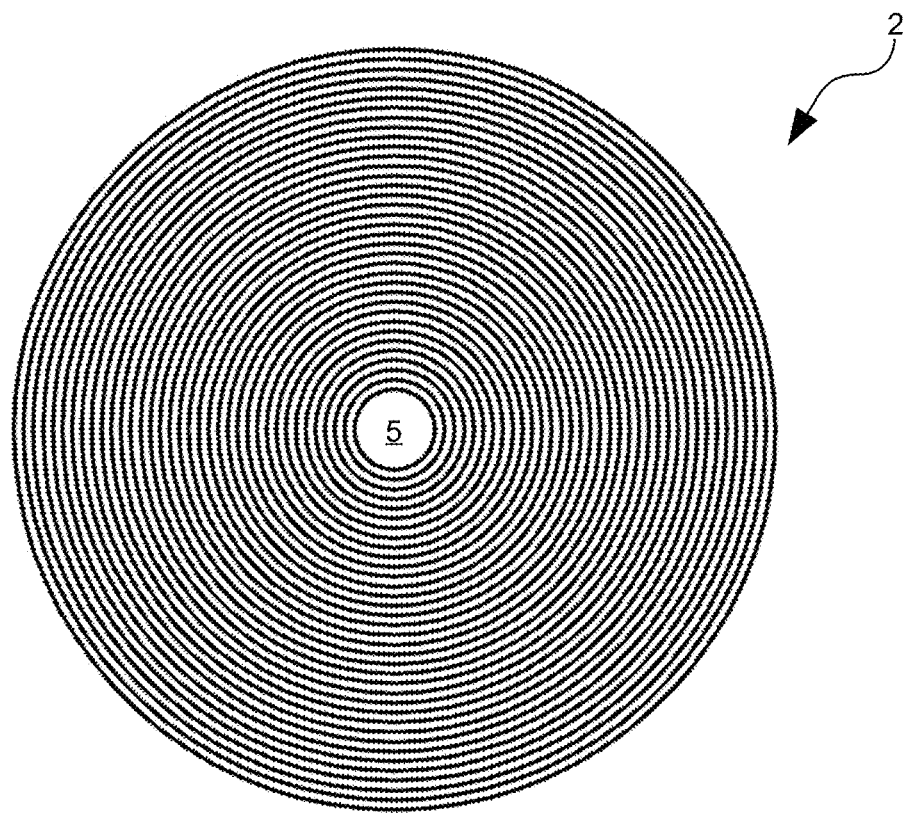
FIG. 5 shows a bottom plan view of the apparatus illustrating the configuration of the heat dissipation fins.

As is shown in at least FIG. 2, the radiant disk heater element 2 comprises a circular cross-section.

The apparatus 1 further comprises an electric heater element thermally coupled to the radiant heater disk element 2 to heat the radiant disk heater element 2 to radiate heat from a radiant heat emitting undersurface 5 thereof. Electric supply wiring may travel through the mounting pole 3.

An escutcheon plate 6 may be provided at the interface of the ceiling 4 and the mounting pole 3 and a flanged bracket 7 between the mounting pole 3 and the radiant heater disk element 2.

The electric heater element may be configured to heat the radiant heater disk element 2 to approximately 380° C.

Figure 12:
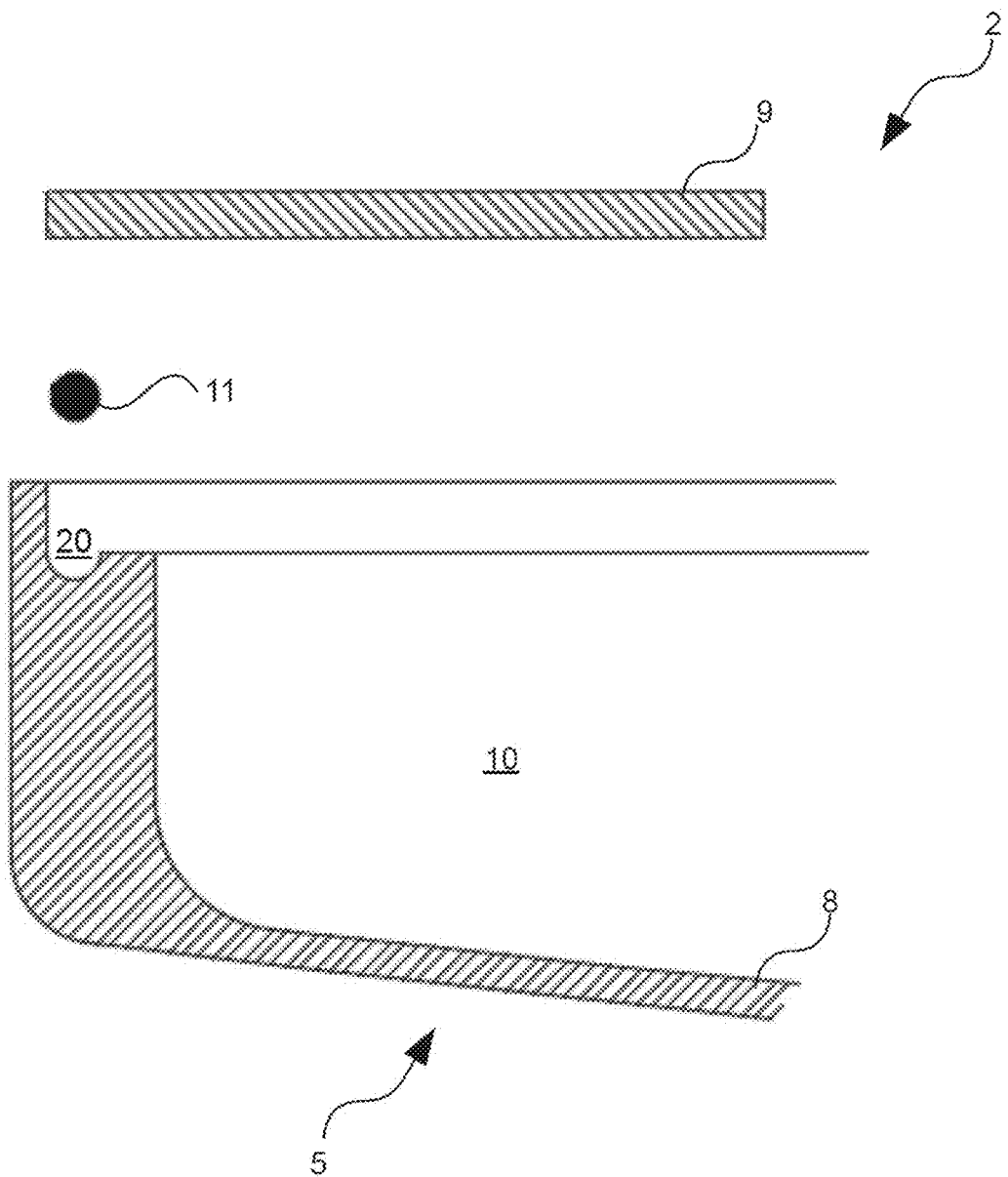
FIG. 12 shows a cross-sectional elevation view of the radiant heater disk element showing the interface between a backing plate and a radiant underplate.

As is shown in FIG. 12, the radiant disk heater element 2 may comprise a radiant underplate 8 and a backing plate 9 thereby defining a void 10 therebetween. The electric element may be located within the void and thermally coupled to a rear surface of the radiant underplate 8.

The radiant underplate may be made from an aluminium alloy.

A circular seal 11 may locate within a recess 20 of the radiant underplate 8 so as to seal the backing plate 9 against the radiant underplate 8.

Figure 13:
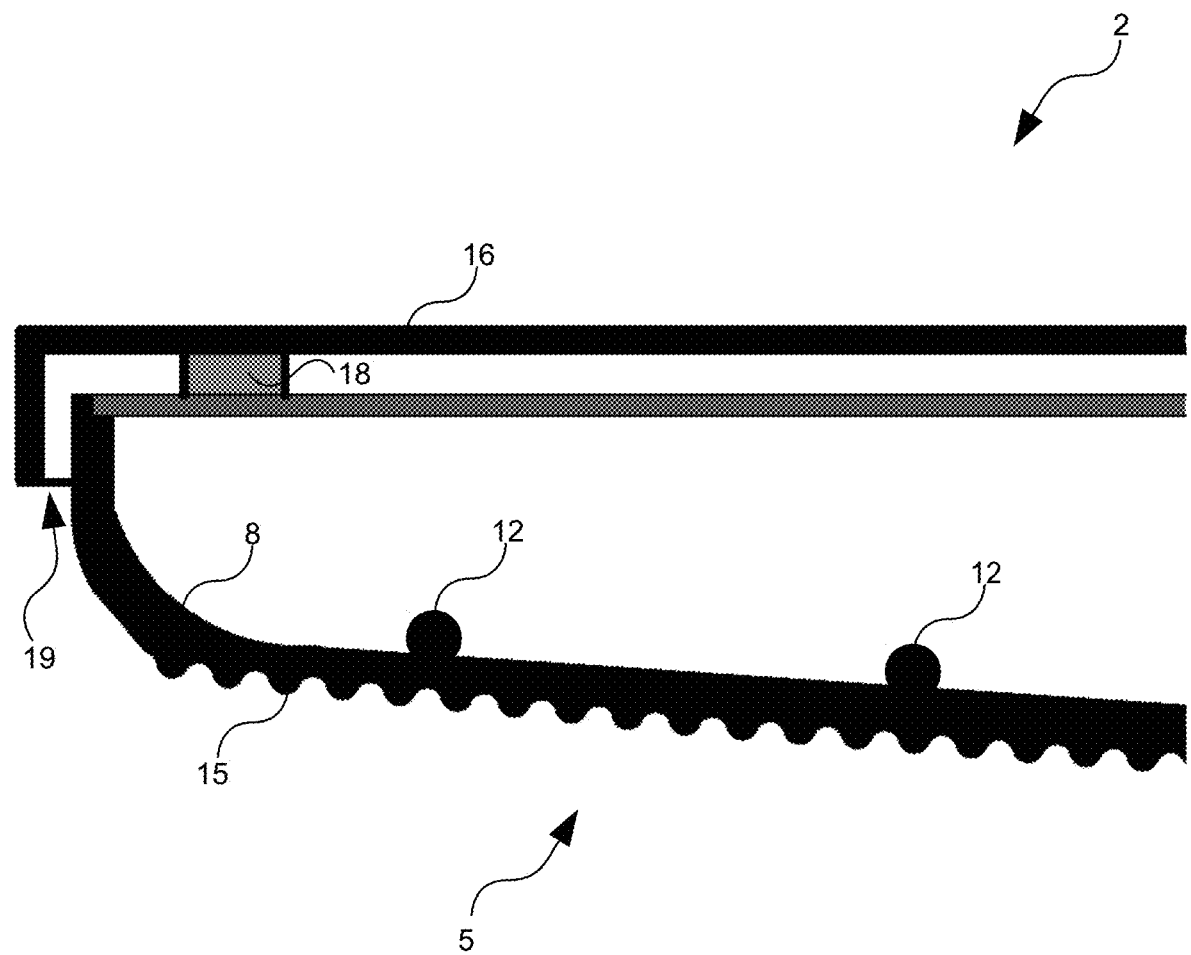
FIG. 13 shows a further cross-sectional elevation view further illustrating a configuration of a rearward heat shield defining an airgap between the heat shield and the backing plate.

FIG. 13 shows a further cross-sectional view of the radiant heater disk element 2 illustrating the juncture between the backing plate 9 and the radiant underplate 8.

The void 10 between the radiant underplate 8 and the backing plate 9 may be filled with a ceramic insulator.

FIG. 13 further illustrates the location of the electric element 12 thermally coupled to a rear surface of the radiant underplate 8.

Figure 11:
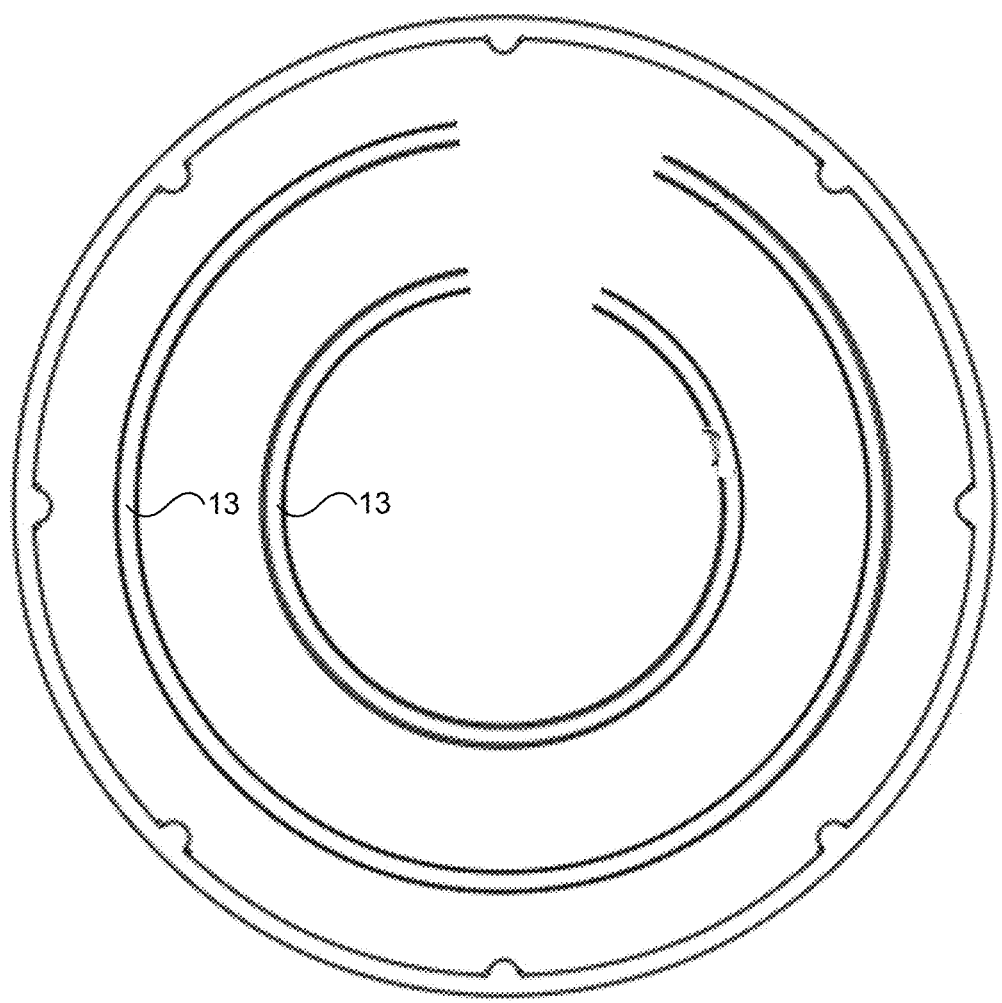
FIG. 11 shows heater element raceways located on a rear surface of a radiant underplate of the radiant heater disk element.

In this regard, as a substantially shown in FIG. 11, the rear surface of the radiant underplate 8 may comprise circular raceways 13 for receipt of the electric element 12 therein and for enhancing thermal conductivity between the electric element 12 and the radiant underplate 8.

Figure 9:
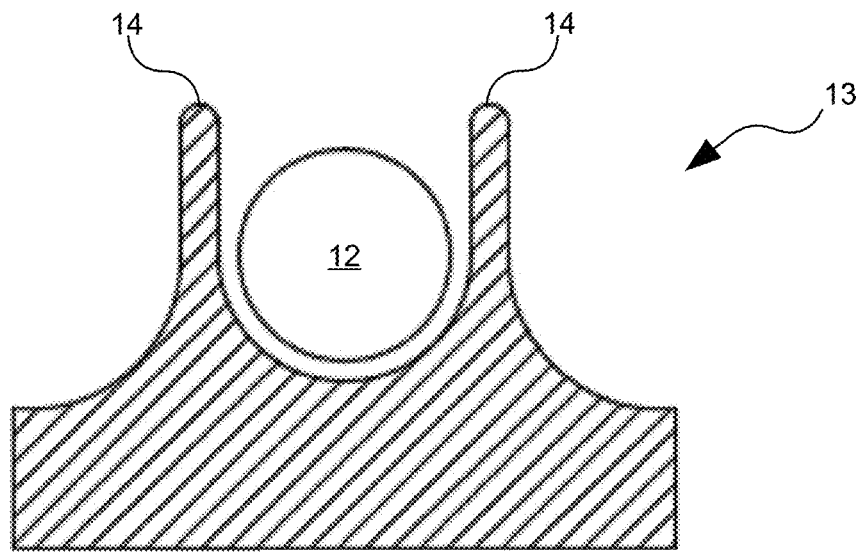
FIGS. 9-10 show cross-sectional views of heater element raceways and the manner for the entrapment of an elongate electric heater element therein.
Figure 10:
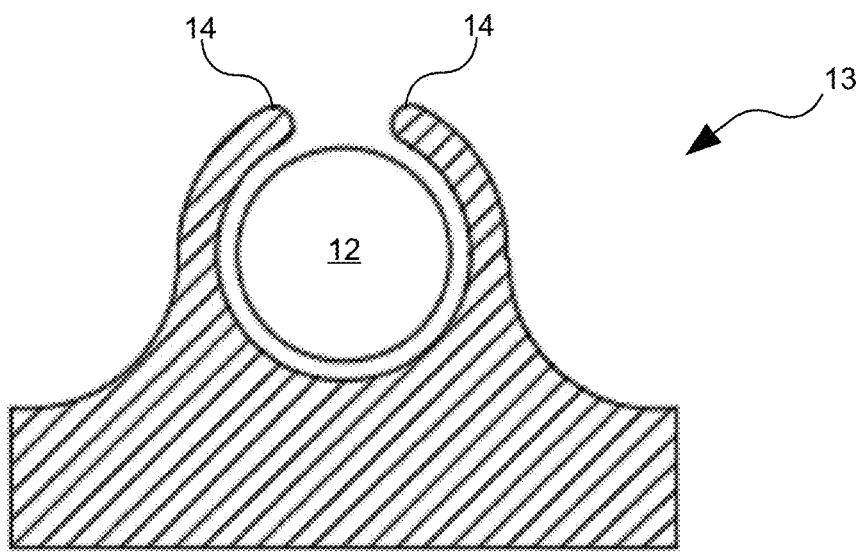

FIG. 9-10 shows the manner for the securement of the linear electric heater elements 12 within the raceways 13 wherein, in the cross-sectional illustration shown, each raceway 13 comprises lateral flanges 14 that are crimped to at least partially surround the electric heater element 12 therebetween.

Figure 14:
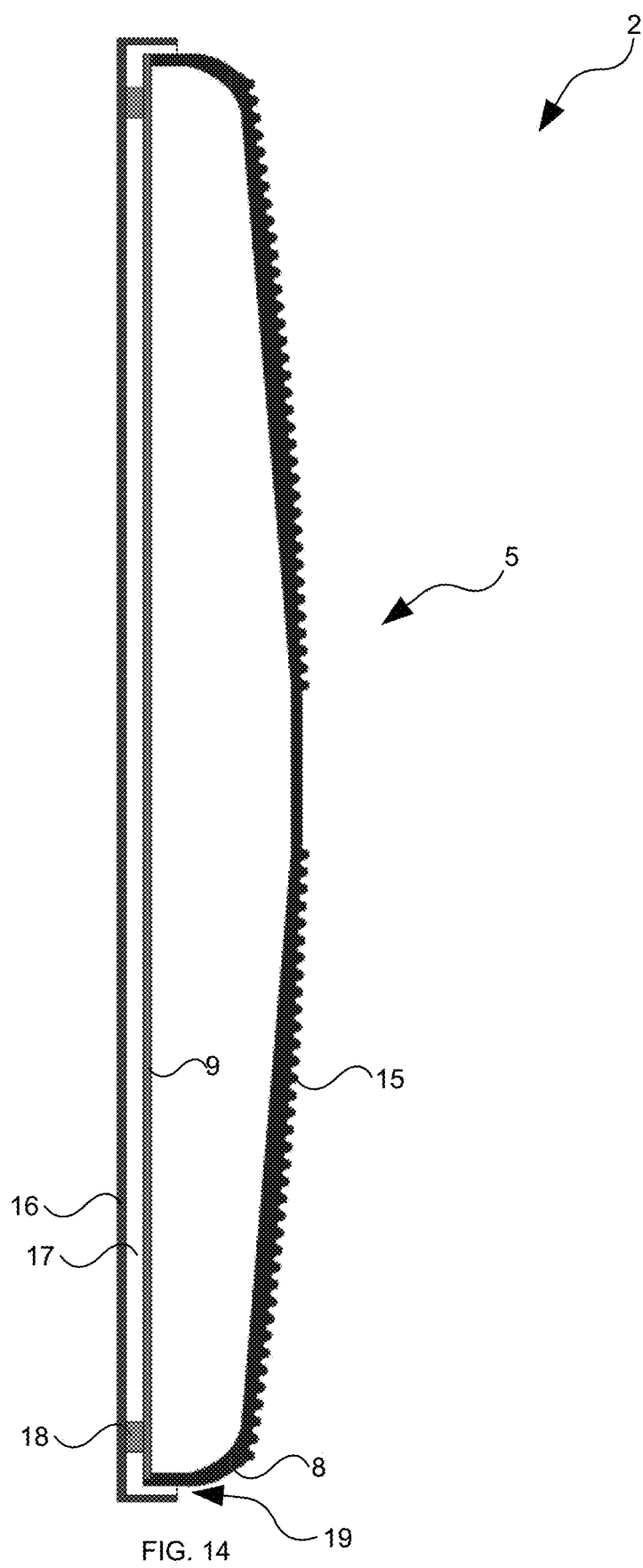
FIG. 14 shows a cross-sectional elevation view of the radiant heater disk element.

FIG. 14 shows the radiant underplate 8 comprising a radial convex curvature. The radiant underplate 8 may be conical and/or stepped as opposed to being curved. As alluded to above, the shape of the radiant underplate 8 may control the heating footprint there underneath wherein the convex curvature may be utilised to broaden the heating footprint. In this regard, in embodiments, the radiant underplate 8 may be concave if it were wished to focus the radiant heat on a particular point.

Figure 6:
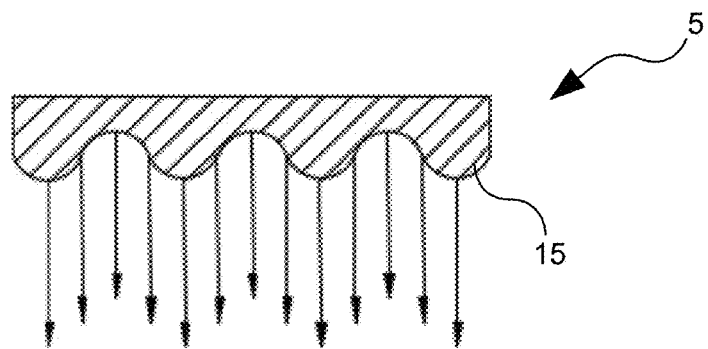
FIG. 6-8 show various configurations of heat dissipation fins.
Figure 7:
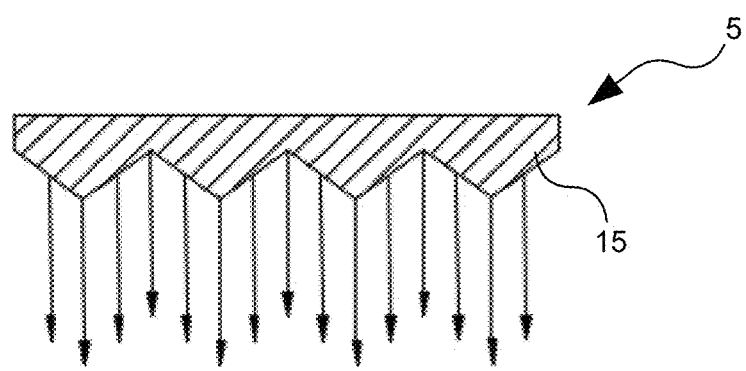
Figure 8:
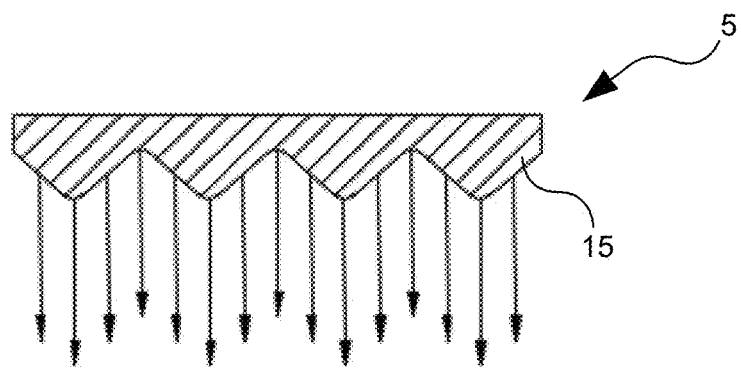

Furthermore, the radiant heat emitting undersurface 5 may comprise heat dissipation fins 15. FIG. 6-8 show various cross-sectional profiles of the heat dissipation fins 15.

FIG. 13 further shows the radiant heater disk element 2 comprising a rearward heat shield 16 offset rearwardly from the back plate 9 so as to define an airgap 17 between the heat shield 16 and the back plate 9. The heat shield 16 may be supported away from the back plate 9 by appropriately spaced spacers 18.

As is also shown in FIG. 13, the heat shield 16 may jut radially beyond the edge of the back plate 9 so as to define a peripheral entrance 19 for collecting convected air rising from the periphery of the radiant underplate 8.

Embodiments of the heater apparatus may provide 2000 W at 240 V and 8.3 A wherein the electric heater element 12 comprises a resistance of 28.8 ohms. Alternatively, at 120 V, the heater apparatus 1 may comprise a power output of 1800 W at 15 A and wherein the electric heater element 12 comprises a resistance of 8 ohms.

For a building space surrounded by four walls, a heater apparatus 1 may effectively cover a floor area of approximately 4.5 m$^2$ wherein the effective heat footprint of the apparatus has a radius of 1.2 m. For building spaces surrounded by two walls, the heater apparatus 1 may cover a floor area of approximately 3.6 m$^2$ (having a heat footprint radius of approximately 1.1 m) and for substantially open spaces the heater apparatus 1 may cover a floor area of approximately 3 m$^2$ (having a heat footprint radius of approximately 1 m).

In one embodiment, the diameter of the radiant heater disk element 2 may be approximately 0.5 m and wherein the radiant heat emitting undersurface may comprise an area of 0.707107 m$^2$.

In embodiments, the heater apparatus 1 may comprise three concentric electric heater elements 12 having respective diameters of 150 cm, 210 cm and 350 cm. Alternatively, the heater apparatus 1 may comprise two concentric heater elements 12 having respective diameters of approximately 238.78 cm and 378.8 cm. In alternative embodiments, the heater elements 12 may be spiralled so as to provide adequate coverage and thermal contact for the underplate 8.

The heater elements 12 are ideally evenly spaced so as to provide uniform heating of the underplate 8 reducing or eliminating hot and cold spots.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An electric suspended radiant disk heater apparatus comprising:
   a central and vertical ceiling mount pole for hanging from a ceiling at an upper end thereof in use;
   a radiant heater disk element comprising a radiant underplate, wherein the radiant heater disk element is fastened at a lower end of the ceiling mount pole and is co-axial with the ceiling mount pole, wherein the radiant heater disk element is perpendicular to the ceiling mount pole and extending radially from the lower end of the ceiling mount pole; and
   at least one electric heater element thermally coupled within at least one respective raceway extending from a rear surface of the radiant underplate to heat the radiant underplate to radiate heat from an undersurface thereof, wherein
   the at least one respective raceway is defined by opposing flanges which extend from the rear surface to enclose the at least one electric heater element between the opposing flanges; and
   each flange widens in cross section both inwardly and outwardly toward the rear surface of the radiant underplate.

2. The radiant disk heater apparatus as claimed in claim 1, wherein the at least one electric element is configured to heat the radiant heater disk elements to 380° C.

3. The radiant disk heater apparatus as claimed in claim 2, wherein the radiant underplate comprises an alloy comprising a glass temperature of 430° C.

4. The radiant disk heater apparatus as claimed in claim 1, wherein radiant heater disk element further comprises a backing plate, wherein the backing plate and the radiant underplate define a void therebetween, wherein the at least one electric heater element is located within the void.

5. The radiant disk heater apparatus as claimed in claim 4, further comprising ceramic insulation within the void.

6. The radiant disk heater apparatus as claimed in claim 4, wherein the radiant underplate is die cast.

7. The radiant disk heater apparatus as claimed in claim 4, wherein the radiant underplate has a radial convex curvature.

8. The radiant disk heater apparatus as claimed in claim 7, wherein the radiant underplate comprises an outer cylindrical portion transitioning to a convex portion.

9. The radiant disk heater apparatus as claimed in claim 8, wherein the outer cylindrical portion defines an upper recess for receipt of a seal therein to seal the radiant underplate and the backing plate.

10. The radiant disk heater apparatus as claimed in claim 4, wherein the undersurface of the radiant underplate comprises concentric heat dissipation fins.

11. The radiant disk heater apparatus as claimed in claim 4, further comprising a heat shield offset rearwardly from the backing plate thereby defining an air gap between the heat shield and the backing plate.

12. The radiant disk heater apparatus as claimed in claim 11, wherein the heat shield juts radially beyond the backing plate to define a convected air collection port to direct convected air into the air gap.

13. The radiant disk heater apparatus as claimed in claim 1, wherein at least one raceway is a plurality of concentric raceways.

* * * * *